(12) United States Patent
Buckner

(10) Patent No.: US 6,223,737 B1
(45) Date of Patent: May 1, 2001

(54) PELLET FUEL BURNING DEVICE

(76) Inventor: Carrol E. Buckner, 5 Piney Dr., Fletcher, NC (US) 28732

( * ) Notice: Subject to any disclaimer, the term of this patent is extended or adjusted under 35 U.S.C. 154(b) by 0 days.

(21) Appl. No.: 09/407,125

(22) Filed: Sep. 27, 1999

(51) Int. Cl.[7] ................ F24B 3/00; F24B 5/00; F24B 13/00; F23K 3/15
(52) U.S. Cl. .................. 126/25 R; 126/7; 126/10; 126/11; 110/108; 110/110; 110/293; 110/294
(58) Field of Search .................. 126/7, 10, 11, 126/25 R, 163 A, 146, 112, 501, 77; 110/104 B, 105, 110, 108, 293, 294, 254, 175 R

(56) References Cited

U.S. PATENT DOCUMENTS

| | | | |
|---|---|---|---|
| 198,613 | * | 12/1877 | Hyden ............................. 110/175 R |
| 973,879 | * | 10/1910 | Promenshenkel . | |
| 1,689,202 | * | 10/1928 | Hare . | |
| 3,223,077 | * | 12/1965 | Tsakos ............................. 126/25 R |
| 4,823,684 | * | 4/1989 | Traeger et al. ...................... 99/447 |
| 5,000,100 | * | 3/1991 | Mendive et al. .................... 110/110 |
| 5,105,797 | * | 4/1992 | Gulutzen et al. .................... 126/146 |
| 5,123,360 | * | 6/1992 | Burke et al. ......................... 11/223 |
| 5,144,939 | * | 9/1992 | Christopherson ................. 126/25 R |
| 5,343,819 | * | 9/1994 | Charest .............................. 110/233 |
| 5,351,633 | | 10/1994 | Buckner . | |
| 5,359,945 | | 11/1994 | Buckner et al. . | |
| 5,375,540 | * | 12/1994 | Verrecchia et al. ................. 110/257 |
| 5,429,110 | * | 7/1995 | Burke et al. ...................... 126/25 R |
| 5,988,157 | * | 11/1999 | Brown et al. ..................... 126/110 R |

* cited by examiner

Primary Examiner—Carl D. Price
(74) Attorney, Agent, or Firm—Dority & Manning, P.A.

(57) ABSTRACT

A pellet fuel burner, such as a cooking grill, has a fire box with a generally open top plane. A pellet burner unit is disposed in the fire box below the cooking surface. A pellet feeding device opens into the fire box and is disposed so as to feed pellets into the burner unit. A pressure box has an inlet supplied with combustion air at a positive pressure. A plurality of outlets are provided in the pressure box and disposed so as to create a turbulent combustion air flow in the pellet burner unit. The outlets may include a first outlet disposed above the burner unit and a second outlet disposed below the burner unit. The turbulent combustion air flow and supply of pellets, particularly corn kernels from the pellet feeding device allow for a continuous sustained combustion of the fuel in the pellet burner.

18 Claims, 6 Drawing Sheets

PELLET FUEL BURNING DEVICE

BACKGROUND OF THE INVENTION

The present invention relates generally to pellet fuel heating units or burners, and more particularly to a grill that utilizes a solid pellet type fuel, and particularly corn kernels.

The use of solid pellets as a fuel source is known, particularly in the art of stoves and the like. For example, U.S. Pat. No. 5,351,633 describes a heating unit particularly suited for burning corn kernels. The corn kernels provide an inexpensive, clean, and readily available fuel source. Other types of solid pellet heating units are also available, for example wood pellet heating units are also known.

A substantial problem with conventional fuel heating units has been the ability to consistently sustain the combustion reaction. One typical problem is with the method of providing air to the fuel to sustain the combustion. Typical stoves or heating units are closed and vented systems and utilize either a positive or negative pressure system for supplying combustion air to the heating unit. The conventional systems utilize a blower to supply air to the burner portion of the heating unit. If the blower is located upstream of the heating unit, than the unit is said to be a positive pressure system since the fire box will have a pressure greater than atmospheric. If the blower is located beyond or downstream of the fuel burner, the system is a negative pressure system and combustion air is essentially sucked into the burner, which has a pressure slightly less than atmospheric.

However, the use of either positive or negative pressure systems present several problems. For example, with the positive pressure system, the fire box is under pressure so that when the door or other access to the fire box is opened, smoke and other matter is generally pushed into the room. With the negative pressure system, there is a tendency for the blower to clog from the particulate material and the exhaust gases. Neither of these systems would be particularly suitable for outdoor grill applications.

The use of charcoal, gas, and wood as a fuel source for outdoor barbeque grills is well known. The styles and configurations of outdoor grills are vast and varied in the industry. However, conventional grills have inherent disadvantages depending particularly on the type of fuel utilized by the grill. For example, creosote chemicals, hydrocarbons, gases, and other undesirable chemicals actually cook into the food, particularly if charcoal or wood is the fuel source.

Propane or natural gas grills pose the additional disadvantages of potential dangerous leaks, and explosion hazzards.

Accordingly, the industry is continuously seeking to improve the safety, economy, and overall reliability and effectiveness of outdoor grills.

The present invention seeks to provide an improved solid pellet heating unit that is particularly suited for, but not limited to, an outdoor grill while overcoming the problems encountered with conventional solid pellet fuel burning units.

OBJECTS AND SUMMARY OF THE INVENTION

A principal object of the present invention is to provide an improved pellet fuel burning device.

It is also a principal object of the present invention to provide an outdoor grill that utilizes a solid pellet fuel.

It is an additional object of the present invention to provide a corn kernel fuel grill that cooks food efficiently, safely, and without chemicals of any sort being introduced into the food.

Still a further object of the present invention is to provide a safe and reliable outdoor grill fueled by inexpensive and readily available corn kernels.

Additional objects and advantages of the invention will be set forth in part in the following description, or may be obvious from the description, or may be learned through practice of the invention.

In accordance with the objects and purposes of the invention, a pellet fuel burner or heating unit is provided. The inventive burner or heating unit will be described herein as an outdoor barbeque grill. However, it should be appreciated that the grill embodiment of the invention is being described for explanation purposes only and is in now meant to convey that the invention is limited to grills. The heating or burner unit in accordance with the invention may have a wide array of uses and embodiments, for example a portable heating unit, stove, etc. All such embodiments and uses are within the scope and spirit of the invention.

The grill embodiment according to the present invention is not limited by any particular housing or design configuration. For example, a vast array of designs and styles of grills are known in the industry and the present invention is applicable to all such grills.

The present grill includes a fire box having a generally open top plane. A cooking surface is defined across the top plane. The cooking surface may include an upper grill surface with a grate disposed therebelow. Heat distributing substances, such as ceramic briquettes, and the like, may also be utilized. For example, such ceramic devices may be placed on top of a grate below the grill surface. Heat distributing baffle plates may also be utilized, for example below the grate surface, to evenly distribute and deflect heat from the burner unit across the cooking surface.

The grill includes a pellet burner unit disposed within the fire box below the cooking surface. The burner unit may comprise a perforated pellet holding device and is generally surrounded by a combustion air chamber. The holding device and combustion air chamber may be formed by a box-like structure having outer walls and perforated inner walls. The combustion air chamber is defined between the outer and inner walls. The inner walls define the pellet holding space or device.

A pellet feeding device is provided with an opening into the fire box and is disposed so as to feed the solid pellets, for example corn kernels, into the burner unit. In a preferred embodiment, the pellet feeding device comprises an auger mechanism fed by a pellet storage device, such as a corn hopper. The auger is housed in an auger channel having an inlet in communication with the pellet storage device or hopper, and an outlet that is disposed in the fire box above the pellet burner unit. In this manner, the auger moves the pellets through the auger channel and causes the pellets to drop out of the auger channel outlet and into the pellet burner unit. A power supply and drive mechanism, such as a powered motor, is provided for driving the auger mechanism.

A pressure box is provided having an inlet supplied with combustion air at a positive pressure. In a preferred embodiment, the pressure box is supplied with the combustion air by way of a powered blower. The pressure box has a first outlet into the fire box that is disposed above the burner unit and is configured to direct combustion air down into the burning unit. A flow directing member, such as a flow channel, nozzle, or the like, may be utilized in this regard.

The pressure box further includes a second outlet into the fire box that is disposed generally below the pellet retaining device of the burner unit and is configured to direct combustion air up into the burner unit. By utilizing a combination of a first outlet disposed above the burner unit and a second outlet disposed below the burner unit, a turbulent combustion air flow is generated through the burner unit to sustain combustion of pellets, and particularly corn kernels, within the burner unit. For example, in the embodiment wherein the burner unit comprises a box-like structure having a combustion air chamber defined between outer walls and perforated inner walls, the second outlet of the pressure box lets out into the combustion air chamber such that the combustion air circulates within the combustion air chamber around and into the perforated holding device. The pellets or corn kernels are dropped into the perforated holding device and, thus, a turbulent air flow is created through the mass of pellets.

The components of the invention may all be housed in a housing structure that essentially defines the style and configuration of the grill. In this regard, the housing structure can take on any manner of configuration, design, and the like.

The invention will be described in greater detail below through use of the appended figures.

DETAILED DESCRIPTION

Figure 1:
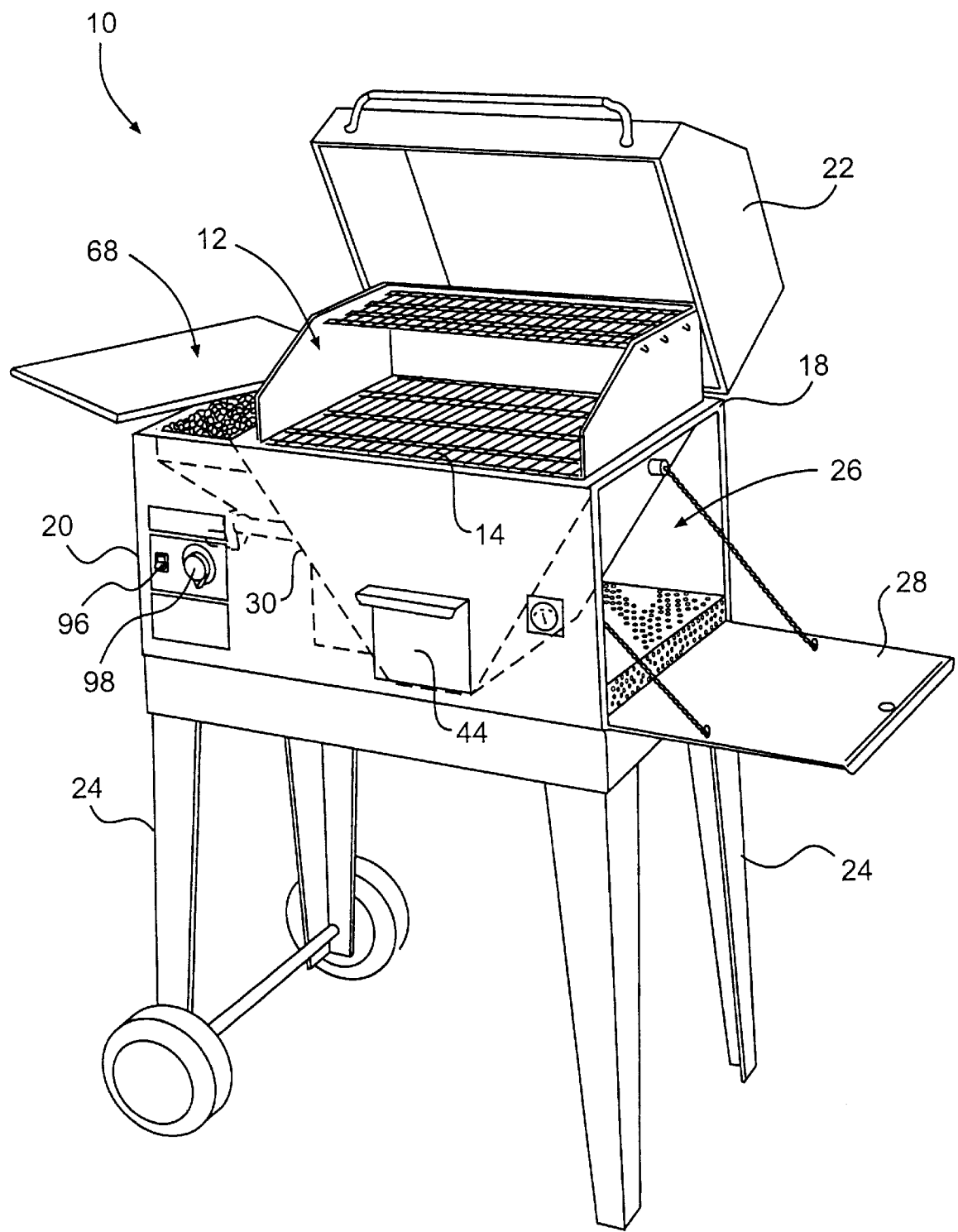
FIG. 1 is a perspective view of an embodiment of an outdoor cooking grill according to the present invention.

Reference will now be made in detail to a presently preferred embodiment of the invention, one or more examples of which are illustrated in the drawings. Each example is provided by way of explanation of the invention, and not meant as a limitation of the invention. For example, features illustrated or described as part of one embodiment can be used on another embodiment to yield still a further embodiment. It is intended that the present application include such modifications and variations as come within the scope and spirit of the invention. As explained above the grill embodiment of the present invention is provided for purposes of explanation and is not a limitation of the scope or field of use of the invention.

FIG. 1 illustrates a grill 10 according to the present invention. Grill 10 includes a housing, generally 18 that may further be defined by sides 20, a top 22, legs 24, and the like. It should be appreciated that the style and configuration of housing 18 is not a limiting factor of the present invention and may incorporate any desirable housing structure or member depending on the embodiment of the burner unit desired.

Housing 18 may further define a warmer section 26 that is accessible through a door 28. Warmer section 26 may be used for any purposes, such as defrosting food, or warming food.

Figure 2:
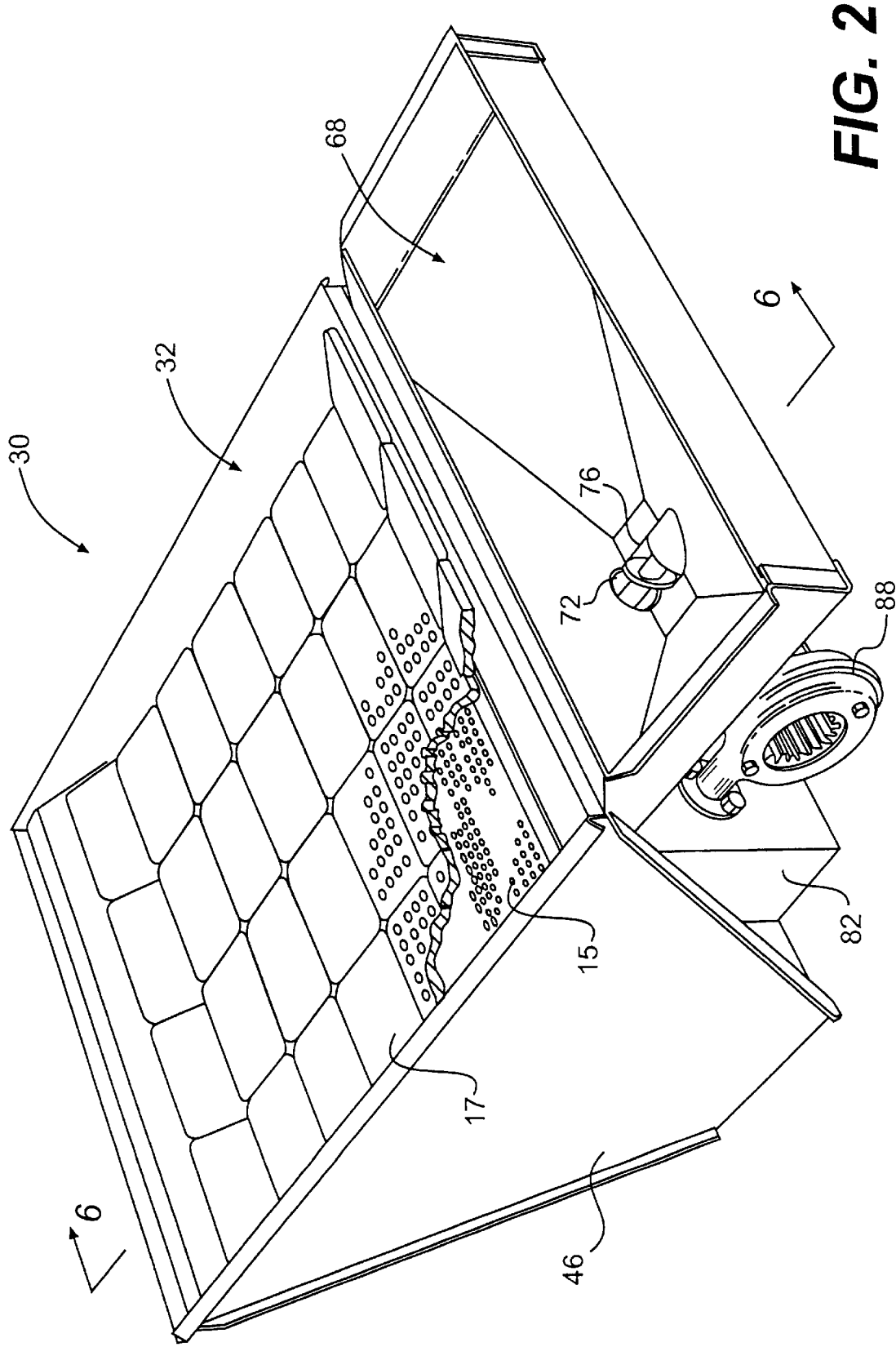
FIG. 2 is a perspective view of the fire box assembly utilized in the grill illustrated in FIG. 1.
Figure 4:
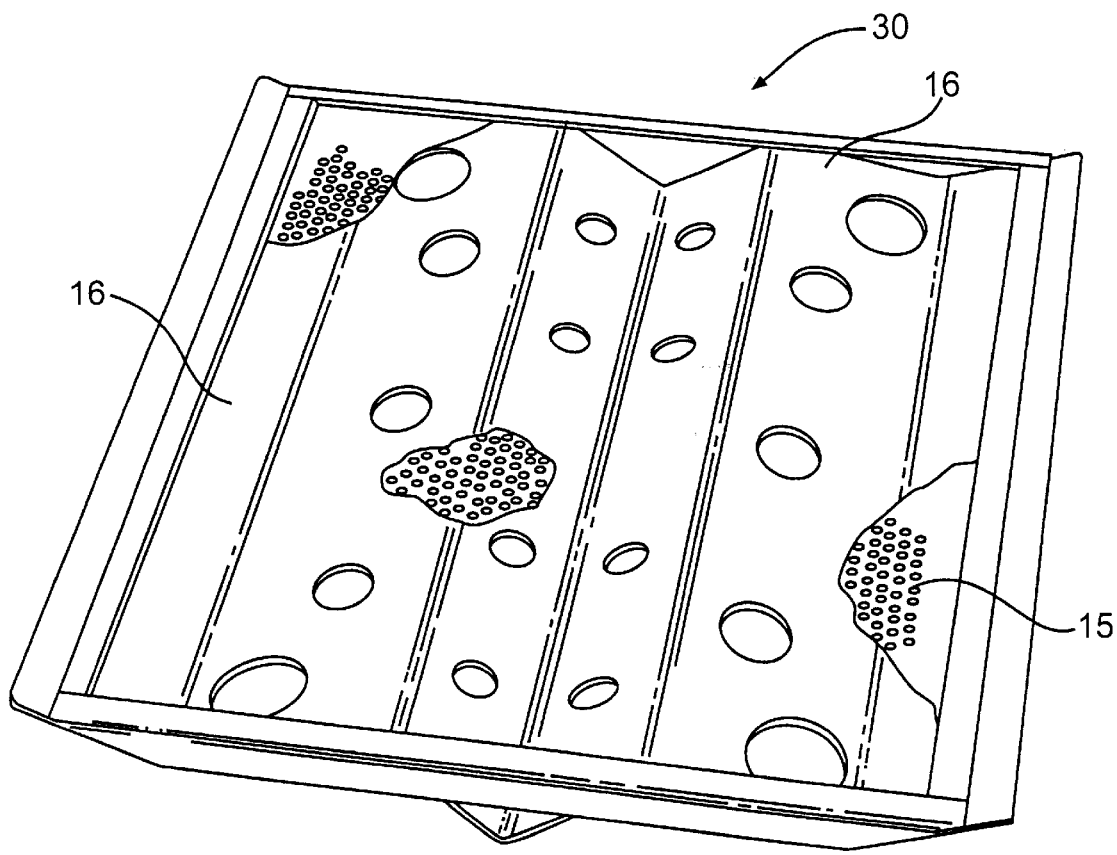
FIG. 4 is a top view of the cooking surface components of the grill.

Grill 10 defines a cooking surface, generally 12. Cooking surface 12 may further be defined by a number of additional components, for example, a cooking grill 14 may be the uppermost surface. Referring generally to FIGS. 2 and 4, additional heat distributing devices may be disposed below grill 14. For example, a grate 15 may be disposed across the top open plane of a fire box 30. Fire box 30 will be described in greater detail below. Efficient heat distributing substances, such as ceramic bricks, and the like, may be placed above grate 15, as particularly illustrated in FIGS. 2 and 6. Perforated angled baffle plates 16 may be disposed below grate 15 generally within fire box 30. The angled baffle plates distribute the heat from the fire box evenly across the cooking surface.

It should be appreciated that any number of components may be utilized to define the cooking surface and to evenly distribute the cooking heat from the fire box.

Grill 10 further includes a fire box, generally illustrated as 30 in the figures. Fire box 30 is disposed within the housing structure 18 and has a generally open top plane 32. The cooking surface is defined across the open top plane 32 of fire box 30, as described above. Fire box 30 is defined by a front wall 46, a back wall 48. A vertical riser section 34 and diverging section 38 are defined between the front and back walls. Vertical riser section 34 is defined by generally vertical walls 36 and diverging section 38 is defined by diverging walls 40, as particularly illustrated in FIG. 6.

Fire box 30 houses the heat generating unit of the grill 10, which will be described in greater detail below. Heat is generated in the bottom portion of the vertical riser section 34 and rises into diverging section 38. The heat is directed from the diverging section 38 across the cooking surface by use of the components described above.

A pellet burner unit, generally 50, is disposed in the vertical riser section 34 of fire box 30. The pellet burner unit is particularly designed for burning solid corn kernels as the fuel source. In a preferred embodiment of the pellet burner unit shown in the figures, a box-like structure is provided and defined by outer walls 52 and converging inner perforated walls 56. The perforated walls 56 further define a pellet receptacle 64. In other words, the pellets or corn kernels are dropped into pellet receptacle 64 defined by inner perforated walls 56. An open top 54 is defined by the box-like structure.

Figure 6:
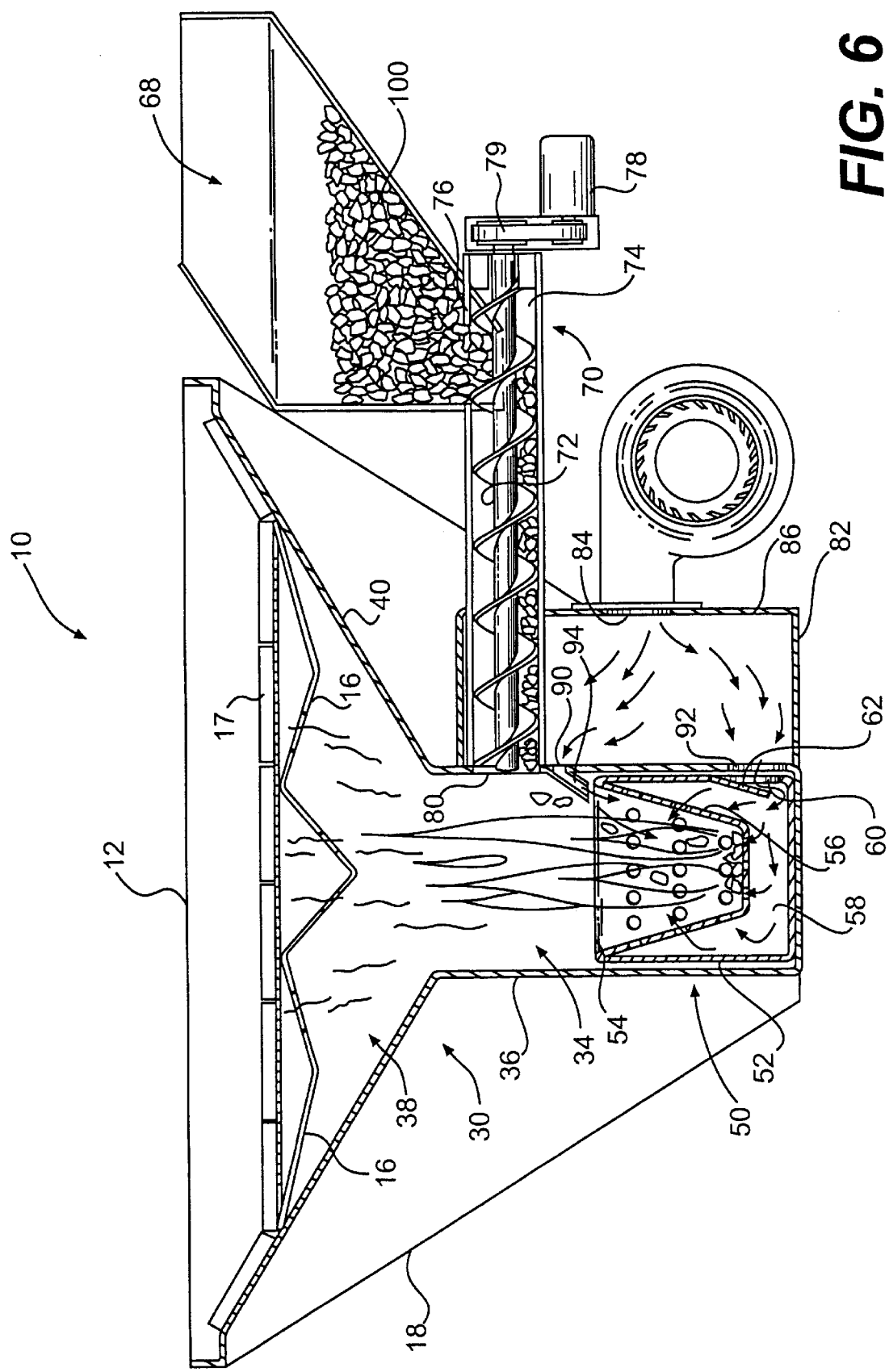
FIG. 6 is a detailed cut-away side view of the fire box assembly, including the pressure box and pellet feeding device.

A combustion air space or chamber 58 is defined between outer walls 52 and inner converging walls 56. An inlet 60 is defined in one of the outer walls 52 into the combustion air chamber 58. A diverting member, such as an angled plate 62, is disposed adjacent to opening 60 and directs incoming combustion air downward into the combustion chamber 58. The incoming combustion air is thus caused to flow down and around pellet receptacle 64 within combustion air chamber 58 and to diffuse into pellet receptacle 64 through the perforated inner walls 56. In this manner, a turbulent air flow is generated from the below and around pellet receptacle 64, as generally illustrated in FIG. 6.

Grill 10 also includes a pressure box, generally 82, defined by sides 86. Pressure box 82 is supplied with a positive source of pressure through, for example, a blower 88. Blower 88 draws from atmospheric air and supplies positive pressure through an inlet 84 into pressure box 82.

A first outlet 90 is defined in pressure box 82 and is disposed above the top 54 of pellet burner unit 50. The first outlet 90 is configured so as to direct combustion air down into the pellet receptacle 64. In this regard, a flow member 94, such as an angled tube, pipe, nozzle, or the like, may be utilized in this regard.

Pressure box 82 includes a second outlet 92 into fire box 30 as disposed generally below the burner unit, particularly the pellet receptacle 64. Outlet 92 supplies combustion air into the combustion air chamber of the pellet burner unit, as described above.

Figure 7:
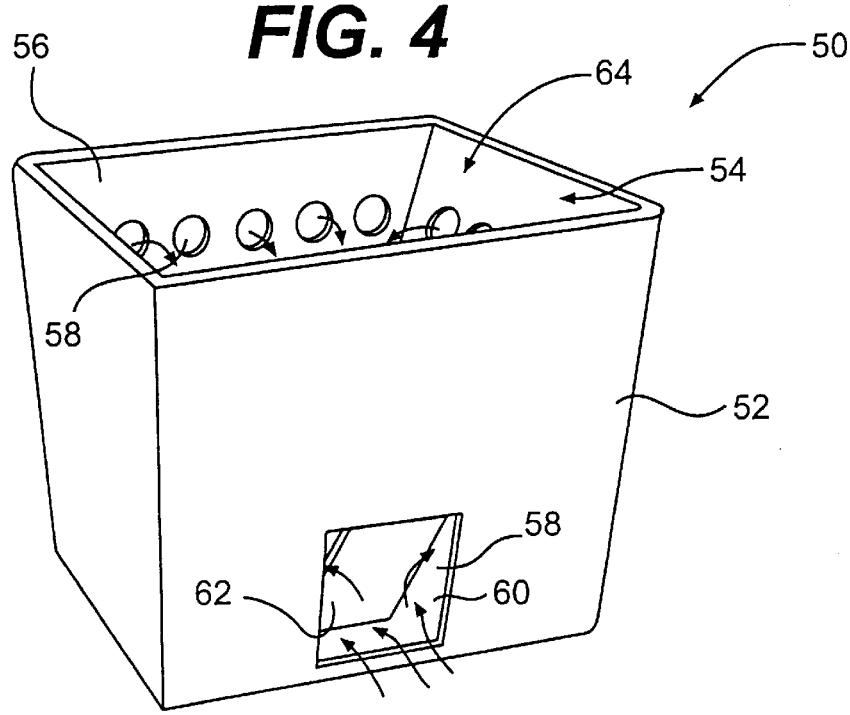
FIG. 7 is a perspective view of the pellet burner unit.

FIG. 7 shows a detailed view of the pellet burner unit, and particularly the box-like structure defined by outer walls 52 and converging inner walls 56. The arrows illustrate the combustion air being directed into inlet 60 and being diverted downwards by diverting member or plate 62.

Figure 3:
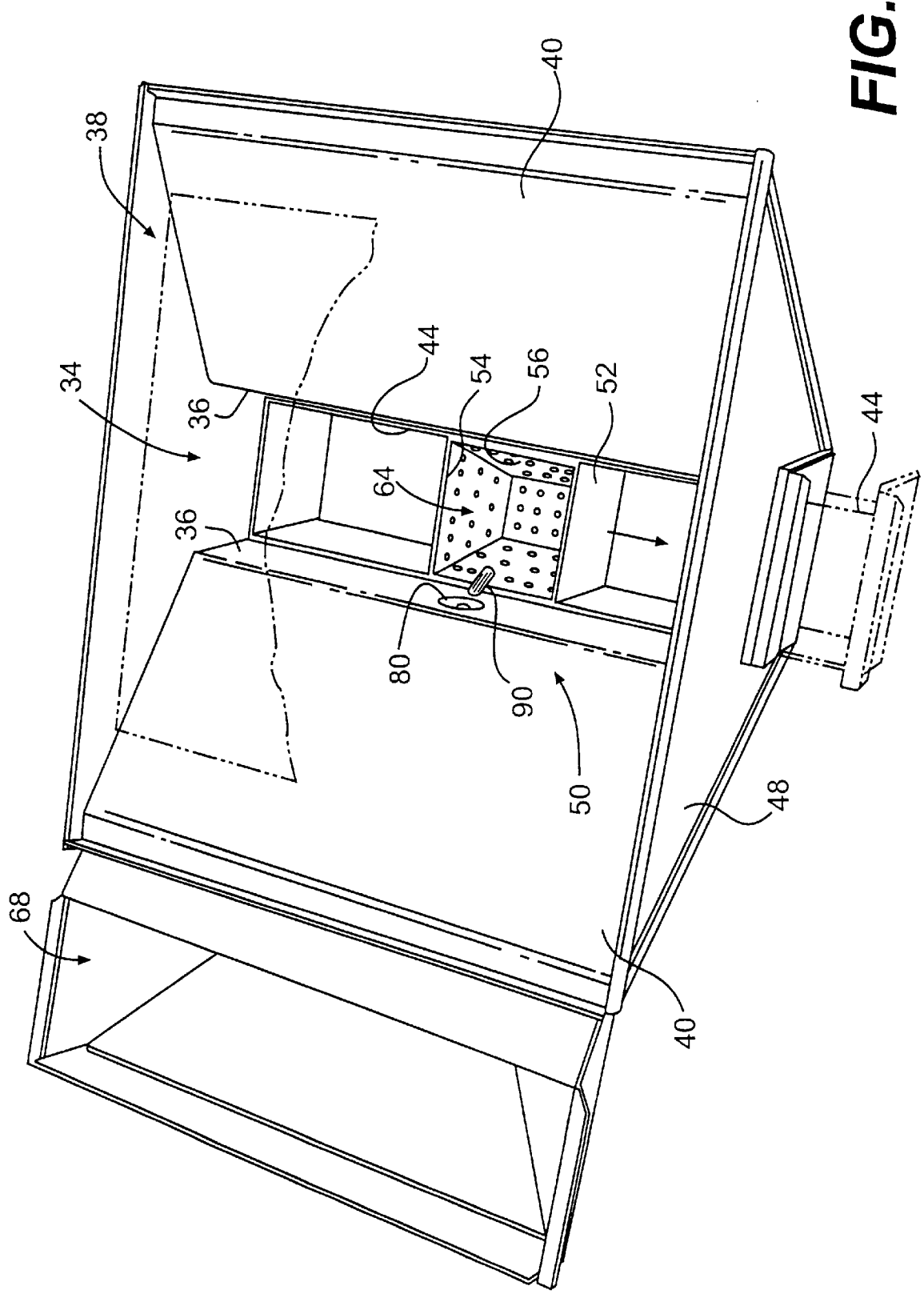
FIG. 3 is a top perspective view of the fire box assembly.

FIG. 3 shows an upper view of the fire box and pellet burner unit. Referring particularly to FIG. 3, it can be seen that the pellet burner unit is carried by a removable tray 44. In this regard, the pellet burner unit can be periodically removed to empty any residue therefrom.

A pellet feeding device, generally 66, is also provided. In the preferred embodiment illustrated, pellet feeding device 66 is particularly configured for delivering a metered flow of corn kernels 100 into the pellet burner unit 50, as particularly illustrated in FIG. 6. Applicants have found that corn kernels are a most desirable fuel source in that they provide a relatively inexpensive, clean, and readily available fuel source. The corn burns cleanly and completely without introducing fumes or chemicals into the food. The corn is relatively easy to initially light and, once combustion is initiated, the combustion reaction is self-sustaining so long as sufficient turbulent air is provided into the pellet receptacle 64 and a metered amount of corn kernels are also delivered into receptacle 64.

Figure 5:
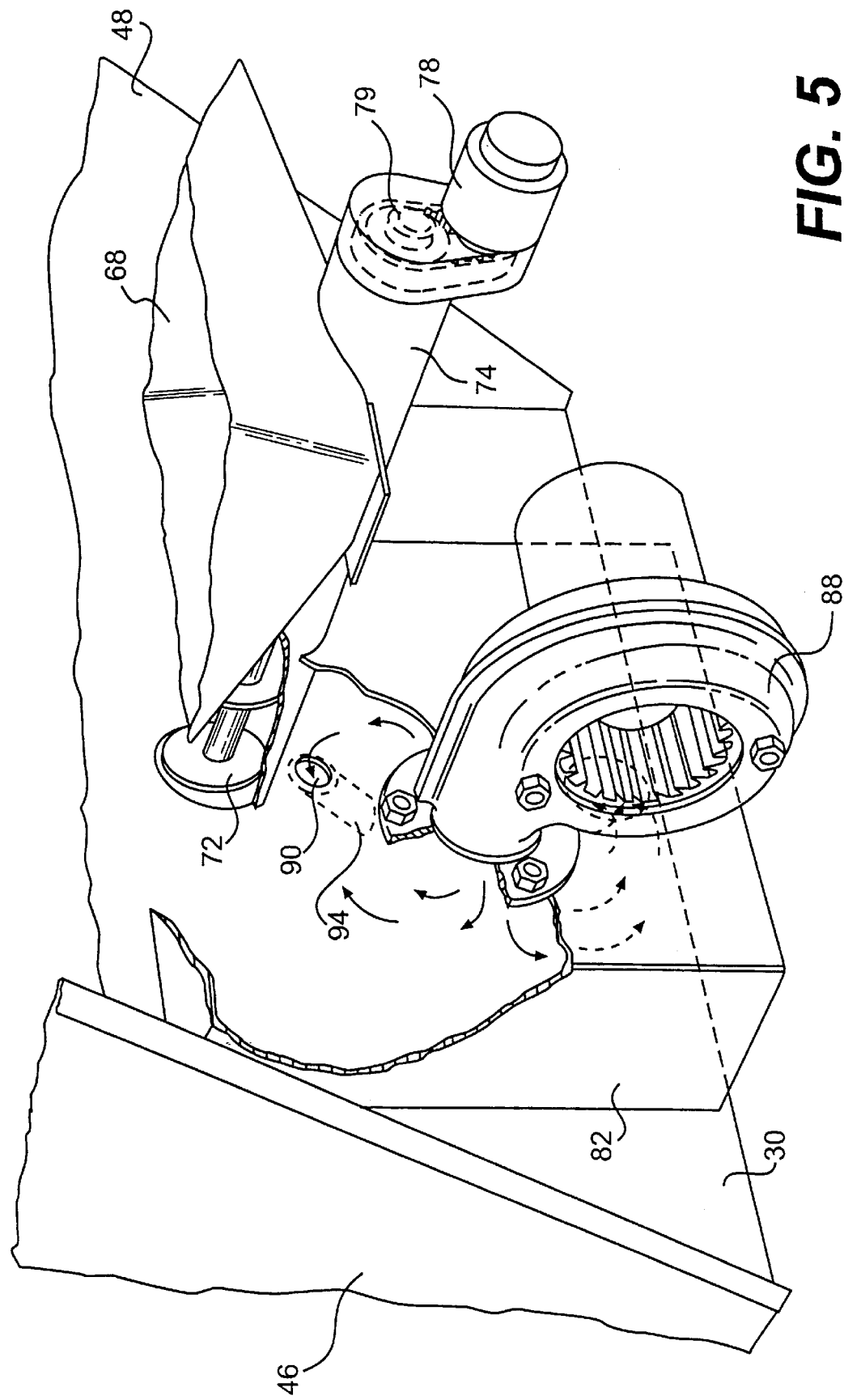
FIG. 5 is an exploded partial cut-away view of the pressure box and pellet feeding device utilized in the grill.

Referring particularly to FIGS. 5 and 6, pellet feeding device 66 includes a pellet storage device, such as a hopper 68. Loose pellets or corn kernels 100 are simply dumped into hopper 68. An auger device 70 delivers kernels 100 from hopper 68 to the pellet burner unit 50. Referring particularly to FIG. 6, an auger 72 is housed in an auger channel 74. An inlet 76 is provided in channel 74 for receiving corn kernels 100 from hopper 68. An outlet 80 is defined into fire box 30 above the pellet burner unit 50. Auger 72 is driven by a conventional powered motor 78 and transmission or gear arrangement 79. The auger is controlled by a feed control device 98 provided on the grill housing, as particularly shown in FIG. 1. The flow rate of fuel pellets into burner unit 50 is controlled by varying the auger speed. Likewise, the blower is also controlled by a blower switch or control device 96 also provided on housing 18. In this regard, blower 88 may comprise a variable speed blower so that the combustion air can be controlled proportionately with the mass flow rate of the fuel pellets. However, a single speed blower may be sufficient for the desired cooking range of the grill.

It should be appreciated that a number of factors will affect the capacity of the grill. For example, the size of the fire box, the size of the pellet burner unit, the size of the pressure box and blower, and the mass flow rate of the fuel pellets will all affect the combustion rate of the fuel and heating capacity of the grill. A larger pellet burner unit will be able to sustain combustion of a greater number of pellets and require a proportionately greater amount of turbulent combustion air flow. It is within the level of those skilled in the art to define and size the components according to the size and heating capacity of the grill desired. All such combinations come within the scope and spirit of the present invention.

Applicant has found that an important aspect of the invention is the necessity to create and maintain a turbulent combustion air flow through the fuel pellets. In this regard, the placement of the first and second outlets from the pressure box into the pellet burner unit are selected to sustain the turbulent air flow. In the preferred embodiment illustrated in the figures, the first and second outlets are disposed above and below the pellet receptacle 64. However, different arrangements of the outlets are within the scope and spirit of the invention so long as the turbulent air flow is created and maintained.

In operation of the grill, a supply of corn kernels 100 is provided in the hopper or storage device 68. A handful of kernels are also placed in the burner unit. The initial combustion of the kernels must be provided by an outside source, such as wood chips, lighter fluid, or the like. Once the kernels in the burner unit are initially lit, the pellet feeding device and blower are controlled so as to continuously feed the kernels in a metered flow into the pellet burner unit. The blower continuously supplies turbulent air flow to the pellet burning unit through pressure box 82 and outlets 90 and 92. The combustion reaction is self sustaining once the initial corn kernels are lit so long as sufficient fuel and turbulent air flow is provided. It is within the scope and spirit of the invention to initiate the combustion reaction by any conventional means, including an electric starter device, spark ignition device, flame device, etc.

It should be appreciated by those skilled in the art that various modifications and variations can be made in the present invention without departing from the scope and spirit of the invention. It is intended that the invention include such modifications and variations as come within the scope of the appended claims and their equivalents.

What is claimed is:

1. A pellet fuel cooking grill, comprising:
   a fire box having a generally open top plane, and a cooking surface disposed generally across said top plane;
   a pellet burner unit disposed within said fire box below said cooking surface;
   a pellet feeding device opening into said fire box and disposed so as to feed pellets into said burner unit;
   a pressure box having an inlet supplied with combustion air at a positive pressure, and a first outlet into said fire box disposed above said burner unit and configured so as to direct substantially all of the combustion air exiting therefrom down into said burner unit, said pressure box further comprising a second outlet into said fire box disposed below said burner unit and configured to direct combustion air up into said burner unit; and
   wherein a turbulent combustion air flow in generated through said burner unit by mixing of combustion air from said first and second outlets to sustain combustion of pellets within said burner unit.

2. The grill as in claim 1, wherein said pellet feeding device comprises an auger mechanism fed by a pellet storage device.

3. The grill as in claim 2, wherein said auger mechanism is automatically powered so as to deliver a desired flow rate of pellets to said burner unit.

4. The grill as in claim 1, wherein said burner unit comprises a perforated pellet holding device generally surrounded by a combustion air chamber, said second outlet letting out into said combustion air chamber such that combustion air circulates within said combustion air chamber around and into said perforated holding device.

5. The grill as in claim 1, wherein said first outlet is disposed above a top plane of said burner unit, and further comprising a flow member disposed so as to direct combustion air from said first outlet downwards into said burner unit.

6. The grill as in claim 1, further comprising a blower in communication with said pressure box.

7. The grill as in claim 1, further comprising heat baffle plates disposed within said fire box proximate to said cooking surface so as to more uniformly distribute heat from said fire box to said cooking surface.

8. The grill as in claim 1, wherein said grill is a corn kernel burning grill.

9. The grill as in claim 1, wherein said burner unit comprises a box-like structure removably disposed within said fire box.

10. The grill as in claim 9, wherein said box-like structure further comprises outer walls and inner perforated walls defining a pellet receptacle, and wherein a combustion air flow chamber is defined between said inner and outer walls with an inlet defined in said outer walls that is placeable in communication with said pressure box second outlet.

11. The grill as in claim 9, further comprising a tray member slidable within said fire box, said burner unit placable on said tray.

12. A corn kernel fueled burner, comprising:
a housing member;
a fire box disposed within said housing having a generally open top plane;
a corn kernel burner unit disposed within said fire box below said top plane;
an automatic corn kernel feeding device opening into said fire box and disposed so as to feed corn kernels into said burner unit at a desired flow rate of kernels; and
a pressure box having an inlet in communication with a blower and first and second outlets into said fire box disposed so as to direct combustion air streams from above and below directly into said burner unit such that the combustion air streams mix in said burner unit to create and maintain a turbulent combustion air flow through the corn kernels to sustain combustion of corn kernels within said burner unit.

13. The burner as in claim 12, wherein said burner unit comprises a perforated kernel holding device generally surrounded by a combustion air chamber, said second outlet letting out into said combustion air chamber such that combustion air circulates within said combustion air chamber around and into said perforated holding device.

14. The burner as in claim 12, wherein said first outlet is disposed above a top plane of said burner unit, and further comprising a flow member disposed so as to direct combustion air from said first outlet downwards into said burner unit.

15. The burner as in claim 12, wherein said burner unit comprises a box-like structure removably disposed within said fire box.

16. The burner as in claim 15, wherein said box-like structure further comprises outer walls and inner perforated walls defining a pellet receptacle, and wherein a combustion air flow chamber is defined between said inner and outer walls with an inlet defined in said outer walls that is placeable in communication with said pressure box second outlet.

17. A pellet fuel cooking grill, comprising:
a fire box having a generally open top plane, and a cooking surface disposed generally across said top plane;
a pellet burner unit disposed within said fire box below said cooking surface;
a pellet feeding device opening into said fire box and disposed so as to feed pellets into said burner unit;
a pressure box having an inlet supplied with combustion air at a positive pressure, and a first outlet into said fire box disposed above said burner unit and configured so as to direct combustion air down into said burner unit, said pressure box further comprising a second outlet into said fire box disposed below said burner unit and configured to direct combustion air up into said burner unit;
wherein a turbulent combustion air flow in generated through said burner unit by said first and second outlets to sustain combustion of pellets within said burner unit;
wherein said burner unit comprises a perforated pellet holding device generally surrounded by a combustion air chamber, said second outlet letting out into said combustion air chamber such that combustion air circulates within said combustion air chamber around and into said perforated holding device; and
further comprising a combustion air flow diverting member disposed so as to direct combustion air from said second outlet downwards into said combustion air chamber.

18. A corn kernel fueled burner, comprising:
a housing member;
a fire box disposed within said housing having a generally open top plane;
a corn kernel burner unit disposed within said fire box below said top plane;
an automatic corn kernel feeding device opening into said fire box and disposed so as to feed corn kernels into said burner unit at a desired flow rate of kernels;
a pressure box having an inlet in communication with a blower and first and second outlets into said fire box disposed so as to create and maintain a turbulent combustion air flow through the corn kernels to sustain combustion of corn kernels within said burner unit;
wherein said burner unit comprises a perforated kernel holding device generally surrounded by a combustion air chamber, said second outlet letting out into said combustion air chamber such that combustion air circulates within said combustion air chamber around and into said perforated holding device; and
further comprising a combustion air flow diverting member disposed so as to direct combustion air from said second outlet downwards into said combustion air chamber.

\* \* \* \* \*